Patented May 2, 1933

1,906,939

UNITED STATES PATENT OFFICE

WILLIAM P. ter HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed July 28, 1931. Serial No. 553,643.

This invention relates to the treatment of rubber and similar materials, more particularly to a treatment of certain derivatives of the reaction products of ketones and salts of aromatic amino compounds or of rearranged reaction products of ketones and amino compounds. It also relates to the products of such treatment.

An object of this invention is to provide materials having the property of retarding the deterioration of rubber. Another object is to provide materials having the property of improving the resistance of rubber to abrasion; another object is to provide materials which prevent or retard cracking of tread stocks containing carbon black. A still further object is to provide materials having vulcanization-accelerating properties. Other objects will be apparent from the herein set forth description.

Accordingly the invention comprises as distinguished from treatment with the naphthol addition product, the treatment of rubber with preferably a naphthol reaction product of a rearranged reaction product of a ketone and an aromatic amino compound. In the case of the addition product the naphthol combines with the rearranged ketone-amine reaction product to form a molecular addition compound, while in the case of the naphthol reaction product water is split off thereby forming condensation products. Such materials are stable, and will when used in rubber exhibit at least one of the above mentioned properties.

Examples of reaction products of ketones and salts of aromatic amino compounds— acetone-aniline-hydrochloride, mesityl oxide-aniline-hydrochloride, diacetone alcohol-aniline-hydrochloride, acetone-diphenyl guanidine hydrochloride, acetone-p,p'-diamino diphenyl methane hydrochloride, acetone-di-o-tolyl guanidine hydrochloride, acetone-o-tolyl biguanide hydrochloride, acetone-diphenylamine hydrochloride, acetone-phenyl-beta-naphthylamine hydrochloride, acetone-aniline acetate, acetone-o-toluidine hydrochloride, acetone-o,o'-diamino-diphenyl sulfide hydrochloride.

Examples of rearranged reaction products of ketones—acetone-aniline rearranged in the presence of aniline hydrochloride, acetone-diphenyl guanidine rearranged in the presence of aniline hydrochloride, acetone-alpha-naphthyl amine rearranged in the presence of aniline hydrochloride.

Examples of naphthol reaction products of a rearranged reaction product of a ketone and an aromatic amino compound—reaction product of beta-naphthol and the reaction product of acetone and aniline rearranged in the presence of aniline hydrochloride.

Instead of the ketones mentioned above the following may be used: phorone, diethyl ketone, benzo phenone, aceto-phenone, dichloracetone, aldol acetone, allyl-acetone, benzal acetone, diacetyl, acetyl-acetone, acetonyl-acetone, salicyl aldehyde-acetone, furfural acetone, mesityl oxide, diacetone alcohol.

Instead of the aromatic amino compounds mentioned above there may be used: monochloro aniline, ortho-toluidine, meta-toluidine, para-toluidine, xylidines, alpha-naphthylamine, beta naphthylamine, amino diphenyl, dinaphthylamines, asymmetric diphenyl hydrazine, diamino diphenyl sulphide, diamino diphenyl polysulphides, diamino dinaphthyl sulfides, p-amino benzyl-aniline, dinaphthyl diamino ethane, ditolyl diamino ethane, p-amino-p'-naphthylamino diphenyl methane, p-p'-diamino diphenyl dimethyl methane, p-p' dinaphthyl amino diphenyl dimethyl methane, phenyl beta naphthyl guanidine, phenyl-o-tolyl guanidine, di-o-tolyl biguanide, monophenyl biguanide, diphenyl biguanide, diphenyl acetamidine, o-phenylene diamine, m-phenylene diamine, p-phenylene diamine, dimethyl p-phenylene diamine, m-toluylene diamine, benzidine, naphthylene diamine; 2,2'-diamino diphenyl; 2,4'-diamino diphenyl; diphenyl-p-phenylene diamine, ditolyl-p-phenylene diamine, dinaphthyl-p-phenylene diamine, diphenyl-benzidine, dinaphthyl-benzidine, naphthyl-m-toluylene diamine, dinaphthyl-m-toluylene diamine; 2,4-diamino-diphenylamine; 4,4'-diamino diphenylamine; or mixtures of any of the foregoing aromatic amino compounds with a phenol such as phenol, alpha-naphthol, beta-naphthol.

Instead of beta naphthol there may be used alpha-naphthol, methylene dibeta naphthol, dihydroxy-naphthalenes such as 1-5 dihydroxy naphthalene.

In the reactions of ketones with salts of aromatic amino compounds, such aromatic amino compounds as contain at least one ortho or para carbon atom linked to hydrogen, have been found to be most suitable.

The reaction may be carried out with or without the aid of dehydrating agent. The following chemicals or mixtures thereof may be used as dehydrating agents: Calcium chloride, iodine, sulphanilic acid, hydrochloric acid, sulphuric acid, phosphorus pentoxide, sodium hydroxide, magnesium perchlorate, acetic acid, barium oxide, zinc chloride, etc. It is an advantage to use the amine-addition product with zinc chloride, for example $(C_6H_5NH_2)$, $ZnCl_2$, as a dehydrating agent.

*Example 1*—Rearranged reaction products of ketones and amino compounds. 105 parts of acetone-aniline reaction product, prepared by reacting under heat and pressure aniline and acetone in the presence of a dehydrating agent such as iodine as described in my copending application Serial No. 411,665, filed December 4, 1929 were mixed with 100 grams of aniline and 20 cc. of concentrated aqueous hydrochloric acid. The mixture was kept at a temperature of 90° C. during 30 hours. At the end of 30 hours the hydrochloric acid was neutralized with caustic soda and unreacted aniline was removed by vacuum distillation. The residue weighed 120 grams and became brittle on cooling. It can be ground to a light brown powder. The product was tested by incorporating 1.5 parts in a tire tread compound as in Example 6, and vulcanizing and ageing as described above. The tensile strengths before and after ageing are shown below.

| Green tensiles | Blank | + Reaction product |
|---|---|---|
| (Cure) 60′ at 45#. | 4260 | 4230 |
| (Cure) 75′ at 45#. | 4415 | 4265 |
| (Cure) 90′ at 45#. | 4215 | 4275 |
| Aged 168 hrs. in oxygen | | |
| (Cure) 60′ at 45#. | 1310 | 3440 |
| (Cure) 75′ at 45#. | 1250 | 3250 |
| (Cure) 90′ at 45#. | 1180 | 3115 |

The accelerating properties of the reaction product is shown by incorporating 1.5 parts of the reaction product in a tire tread compound similar to that above but from which the usual accelerator was omitted.

| | Cure | Tensiles |
|---|---|---|
| Blank | 90′ at 45# | 1830 |
| + reaction product | 90′ at 45# | 3595 |

The accelerating properties are also shown by incorporating 1 part of the reaction product in a rubber mix consisting of 100 parts of rubber, 10 parts of zinc oxide, and 3 parts of sulphur.

| | Cure | Tensiles |
|---|---|---|
| Blank—no accelerator | 60′ at 40# | 402 |
| + reaction product | 60′ at 40# | 2245 |

The simplest acetone aniline reaction product, on rearranging in the presence of aniline hydrochloride, would yield a product of the probable formula

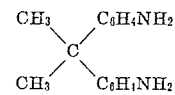

which can be called p, p′-diamino-di-phenyl-di-methyl methane and which also corresponds to the reaction product of acetone and aniline hydrochloride. See German patent to Homolka No. 399,149 of June 16, 1924. The reaction product of one mole of mesityl oxide and one mole of aniline on rearranging would yield a compound of the probable formula:

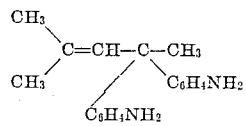

and finally, a phorone-aniline reaction product upon rearranging would yield a product of the probable formula

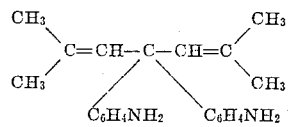

It is obvious that the above and similar products corresponding to the probable general formula

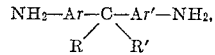

wherein $Ar$ and $Ar'$ are arylene groups, and $R$ and $R'$ are aliphatic hydrocarbon groups which may be saturated or unsaturated.

Rearranged ketone-amine reaction products may be made by rearranging in the presence of aromatic amine salts generally. For example instead of using aniline hydrochloride as in the example above, the hydrochloride of naphthylamine or of diphenyl guanidine may be used. Also when the amine used in the preparation of the ketone-amine is different from the rearranging amines, rearranged ketone-amines of a mixed character result. For example the reaction product of acetone and alpha- or beta- naphthylamine may be rearranged in the presence of aniline hydrochloride, and the reaction product of acetone and 4,4′-diamino-diphenyl amine may be rearranged in the presence of toluidine hydrochloride.

*Example 2*—The di-naphthylated derivative of a rearranged ketone-amine condensation product may be prepared as follows: 150 grams of the rearranged acetone-aniline reaction product prepared as in Example 1, and 176 grams of beta-naphthol, together with 5 grams of iodine, are heated in an open vessel for about 40 hours at a temperature of 200–220° C. Water formed during the reaction distills off continuously until the reaction is complete. The product thus obtained is washed several times with hot caustic alkali solution to remove any unchanged beta-naphthol, and then with hot water until free of alkali: The product thus obtained, when cooled is a brittle brown resin and weighs 280 grams.

The product was incorporated in a tire tread stock in the proportion of 1.5 parts per 100 of rubber. The rubber was then vulcanized 75 minutes at 45#. Tensile strengths of the resulting product, and of a similar product containing no antioxidant, were determined before and after ageing with the following results:

|  | Tensile strength | |
|---|---|---|
|  | No antioxidant | + naphthylated reaction product |
| Before ageing | 3817 | 3940 |
| After ageing 168 hrs. in oxygen | 889 | 2103 |
| After ageing 3 wks. in air at 158° F | 1619 | 2400 |

It is to be understood that a mixture of the reaction products or derivatives may be used in rubber instead of a single reaction product or derivative. Also that a mixture of ketones, or a single ketone may be reacted with a single amino compound or with a mixture of amino compounds, such as described herein, to give products that may be used in rubber in the same manner.

The chemicals disclosed may be used to improve the properties as mentioned herein of inner tubes, tires, thread, hose, dipped goods, mechanical goods, latex or articles made from latex, etc.

"Salt of an aromatic amino compound" and "amine salt" are to be understood as meaning the acid addition product of the amines or amino compounds, such as the hydrochloride, the sulfate, the phosphate, the acetate, etc. Also the term "rubber" is to be construed as including natural rubber, gutta percha, balata, synthetic rubber, or other rubber-like materials.

This case is a continuation in part of application Serial No. 411,666, filed Dec. 4, 1929.

With the detailed description given above, it will be obvious that modifications will suggest themselves without departing from the principle of the invention, for example in the preparation of any of the hereinmentioned compounds, the corresponding thioketone or the corresponding ketone dihalide may be used in place of a ketone, and it is not desired to limit the invention otherwise than as set forth in the appended claims.

Having thus described my invention what I claim and desire to protect by Letters Patent is:

1. A method of treating rubber which comprises treating rubber with a condensation product of a naphthol and a rearranged ketone-aromatic amine reaction product.

2. Method of improving the properties of rubber which comprises treating rubber prior to vulcanization with the condensation product of a naphthol and a compound having the probable formula

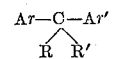

wherein $Ar$ and $Ar'$ are each aromatic groups comprising amino nitrogen and $R$ and $R'$ are each aliphatic hydrocarbon groups which may be saturated or unsaturated.

3. A method of improving the properties of rubber which comprises treating rubber prior to vulcanization with the condensation product of a naphthol and a compound having the probable formula

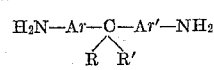

wherein $Ar$ and $Ar'$ are each similar or dissimilar arylene groups and $R$ and $R'$ are each aliphatic hydrocarbon groups which may be saturated or unsaturated.

4. A method of treating rubber which comprises treating rubber with a condensation product of a beta-naphthol and a rearranged aliphatic ketone-aromatic amine reaction product.

5. A method of treating rubber which comprises treating rubber with a condensation product of a beta-naphthol and a rearranged ketone-aromatic amine reaction product.

6. A method of treating rubber which comprises treating rubber with a condensation product of a beta-naphthol and a rearranged acetone-primary aromatic amine reaction product.

7. A method of treating rubber which comprises treating rubber with a condensation product of a beta-naphthol and a rearranged acetone-aniline reaction product.

8. A method of improving the properties of rubber which comprises vulcanizing rubber in the presence of a condensation product of a naphthol and a rearranged ketone-aromatic amine reaction product.

9. A method of improving the properties of rubber which comprises vulcanizing rubber in the presence of a condensation product of a beta-naphthol and a rearranged aliphatic ketone-aromatic amine reaction product.

10. A method of improving the properties of rubber which comprises vulcanizing rubber in the presence of a condensation product of a beta-naphthol and a rearranged ketone-aromatic amine reaction product.

11. A method of improving the properties of rubber which comprises vulcanizing rubber in the presence of a condensation product of a beta-naphthol and a rearranged acetone-primary aromatic amine reaction product.

12. A method of improving the properties of rubber which comprises vulcanizing rubber in the presence of a condensation product of a beta-naphthol and a rearranged acetone-aniline reaction product.

13. A method of improving the properties of rubber which comprises vulcanizing rubber in the presence of a compound having the probable general formula

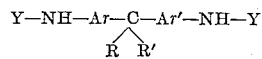

wherein A$r$ and A$r'$ are arylene groups, R and R' are aliphatic hydrocarbon groups which may be saturated or unsaturated, and Y is a naphthyl group.

14. A method of improving the properties of rubber which comprises vulcanizing rubber in the presence of a compound having the probable general formula

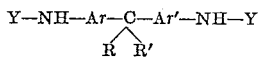

wherein A$r$ and A$r'$ are arylene groups, R and R' are aliphatic hydrocarbon groups which may be saturated or unsaturated, and Y is a beta naphthyl group.

15. A rubber product which has been treated with a condensation product of a naphthol and a rearranged ketone-aromatic amine reaction product.

16. A rubber product which has been treated with a condensation product of a beta-naphthol and a rearranged aliphatic ketone-aromatic amine reaction product.

17. A rubber product which has been treated with a condensation product of a beta-naphthol and a rearranged ketone-aromatic amine reaction product.

18. A rubber product which has been treated with a condensation product of a beta-naphthol and a rearranged acetone-primary aromatic amine reaction product.

19. A rubber product which has been treated with a condensation product of a beta-naphthol and a rearranged acetone-aniline reaction product.

20. A vulcanized rubber product containing rubber which has been vulcanized in the presence of a condensation product of a naphthol and a rearranged ketone-aromatic amine reaction product.

21. A vulcanized rubber product containing rubber which has been vulcanized in the presence of a condensation product of a beta-naphthol and a rearranged aliphatic ketone-aromatic amine reaction product.

22. A vulcanized rubber product containing rubber which has been vulcanized in the presence of a condensation product of a beta-naphthol and a rearranged ketone-aromatic amine reaction product.

23. A vulcanized rubber product containing rubber which has been vulcanized in the presence of a condensation product of a beta-naphthol and a rearranged acetone-primary aromatic amine reaction product.

24. A vulcanized rubber product containing rubber which has been vulcanized in the presence of a condensation product of a beta-naphthol and a rearranged acetone-aniline reaction product.

Signed at Montclair, county of Essex, State of New Jersey, this 24th day of July, 1931.

WILLIAM P. ter HORST.